United States Patent
Sirianni et al.

(10) Patent No.: US 11,494,295 B1
(45) Date of Patent: *Nov. 8, 2022

(54) AUTOMATED SOFTWARE BUG DISCOVERY AND ASSESSMENT

(71) Applicant: Architecture Technology Corporation, Minneapolis, MN (US)

(72) Inventors: Joseph Sirianni, Ithaca, NY (US); Paul Nicotera, Ithaca, NY (US); Eric R. Chartier, St. Louis Park, MN (US); Judson Powers, Ithaca, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/182,895

(22) Filed: Feb. 23, 2021

Related U.S. Application Data

(63) Continuation of application No. 16/440,654, filed on Jun. 13, 2019, now Pat. No. 10,949,338.

(Continued)

(51) Int. Cl.
*G06F 9/44* (2018.01)
*G06F 11/36* (2006.01)
(Continued)

(52) U.S. Cl.
CPC ...... *G06F 11/3692* (2013.01); *G06F 11/3664* (2013.01); *G06F 17/18* (2013.01); *G06N 20/20* (2019.01)

(58) Field of Classification Search
None
See application file for complete search history.

(56) References Cited

U.S. PATENT DOCUMENTS

| 5,974,549 A | 10/1999 | Golan |
| 7,496,959 B2 | 2/2009 | Adelstein et al. |

(Continued)

FOREIGN PATENT DOCUMENTS

WO 2017105383 A1 6/2017

OTHER PUBLICATIONS

"Cybersecurity," U.S. Department of Defense Instruction, No. 8500. 01, Mar. 14, 2014, 59 pp, accessible via https://www.esd.whs.mil/Portals/54/Documents/DD/issuances/dodi/850001_2014.pdf.

(Continued)

*Primary Examiner* — Insun Kang
(74) *Attorney, Agent, or Firm* — Shumaker & Sieffert, P.A.

(57) ABSTRACT

In general, this disclosure describes methods and devices for analyzing source code to detect potential bugs in the code. Specifically, a device retrieves source code of an application. For each distinct execution of a plurality of executions of the application, the device initiates the respective execution at a particular starting point of the source code and inputs, into the source code, a unique set of inputs relative to any other execution. The device stores, into a path log, an indication of each line of source code and stores, into an output log, an indication of each output object encountered during the respective execution. Each output object includes a local variable dependent on the inputs. The device analyzes, using a machine learning model, the path and output logs to identify an abnormality indicative of a potential bug in the source code. The device outputs a graphical representation of the abnormality.

20 Claims, 5 Drawing Sheets

Related U.S. Application Data

(60) Provisional application No. 62/802,364, filed on Feb. 7, 2019.

(51) Int. Cl.
*G06F 17/18* (2006.01)
*G06N 20/20* (2019.01)

(56) References Cited

U.S. PATENT DOCUMENTS

| | | | |
|---|---|---|---|
| 7,818,804 | B2 | 10/2010 | Marceau |
| 7,962,961 | B1 | 6/2011 | Griffin et al. |
| 8,156,483 | B2 | 4/2012 | Berg et al. |
| 8,296,848 | B1 | 10/2012 | Griffin et al. |
| 8,458,805 | B2 | 6/2013 | Adelstein et al. |
| 8,499,354 | B1 | 7/2013 | Satish et al. |
| 8,862,803 | B2 | 10/2014 | Powers et al. |
| 9,076,342 | B2 | 7/2015 | Brueckner et al. |
| 9,081,911 | B2 | 7/2015 | Powers et al. |
| 9,083,741 | B2 | 7/2015 | Powers |
| 9,384,677 | B2 | 7/2016 | Brueckner et al. |
| 10,380,350 | B1* | 8/2019 | Ben Porath ......... G06F 11/3684 |
| 10,540,502 | B1 | 1/2020 | Joyce et al. |
| 10,558,809 | B1 | 2/2020 | Joyce et al. |
| 10,868,825 | B1 | 12/2020 | Dominessy et al. |
| 2007/0297349 | A1 | 12/2007 | Arkin |
| 2008/0114873 | A1 | 5/2008 | Chakravarty et al. |
| 2008/0320437 | A1 | 12/2008 | Maennel |
| 2010/0077075 | A1 | 3/2010 | Cuni et al. |
| 2011/0099538 | A1* | 4/2011 | Naidu Pujala ...... G06F 11/3664 717/124 |
| 2012/0167056 | A1* | 6/2012 | Brunswig ............. G06F 11/362 717/129 |
| 2012/0210427 | A1 | 8/2012 | Bronner et al. |
| 2014/0337971 | A1 | 11/2014 | Casassa Mont et al. |
| 2015/0143343 | A1* | 5/2015 | Weiss ............... G01R 31/31705 717/128 |
| 2015/0213260 | A1 | 6/2015 | Park |
| 2015/0234730 | A1* | 8/2015 | Puthuff ............... G06F 11/3636 717/128 |
| 2015/0339477 | A1 | 11/2015 | Abrams et al. |
| 2016/0099953 | A1 | 4/2016 | Hebert et al. |
| 2016/0234242 | A1 | 8/2016 | Knapp et al. |
| 2017/0060732 | A1* | 3/2017 | Golfieri ............... G06F 11/3664 |
| 2017/0262360 | A1 | 9/2017 | Kochura et al. |
| 2018/0025157 | A1 | 1/2018 | Titonis et al. |
| 2018/0048534 | A1 | 2/2018 | Banga et al. |
| 2018/0068219 | A1 | 3/2018 | Turner et al. |
| 2018/0121657 | A1 | 5/2018 | Hay et al. |
| 2018/0191770 | A1 | 7/2018 | Nachenberg et al. |
| 2018/0285147 | A1* | 10/2018 | Engler .................. G06F 11/362 |
| 2018/0367563 | A1 | 12/2018 | Pfleger de Aguiar et al. |
| 2018/0367593 | A1 | 12/2018 | Aquiar et al. |
| 2019/0012254 | A1 | 1/2019 | Gupta et al. |
| 2019/0014153 | A1 | 1/2019 | Lang et al. |
| 2019/0042947 | A1 | 2/2019 | Turner et al. |
| 2019/0050320 | A1 | 2/2019 | Edri |
| 2019/0102564 | A1 | 4/2019 | Li et al. |
| 2019/0164015 | A1 | 5/2019 | Jones, Jr. et al. |
| 2019/0188615 | A1 | 6/2019 | Liu |
| 2019/0258953 | A1 | 8/2019 | Lang et al. |
| 2019/0266070 | A1* | 8/2019 | Bhandarkar ........ G06F 11/3072 |
| 2019/0294786 | A1 | 9/2019 | Villaviencio et al. |
| 2019/0340392 | A1 | 11/2019 | Khorrami et al. |
| 2019/0347093 | A1 | 11/2019 | Challagolla et al. |
| 2019/0370160 | A1 | 12/2019 | Raman et al. |
| 2020/0034276 | A1* | 1/2020 | O'Dowd ............. G06F 11/3476 |
| 2020/0174910 | A1 | 6/2020 | Mola et al. |
| 2020/0272282 | A1* | 8/2020 | Nychis .................. G06F 9/4488 |
| 2020/0371892 | A1 | 11/2020 | Huang et al. |

OTHER PUBLICATIONS

"Cyberspace Operations," U.S. Air Force, Air Force Policy Directive 10-17, Jul. 31, 2012, 9 pp, accessible via https://fas.org/irp/doddir/usaf/afpd10-17.pdf.

2015 DFRWS Forensics Challenge-Submitted Solutions and Source Code Released, Retrieved from http://www.cs.uno.edu/~golden/gpu-malware-research.html, 5 pgs. Applicant points out, in accordance with MPEP 609.04(a), that the year of publication, 2015, is sufficiently earlier than the effective U.S. filing date of the present application, so that the particular month of publication is not in issue.

Atighetchi et al., "Metrinome-Continuous Monitoring and Security Validation of Distributed Systems", Journal of Cyber Security and Information Systems vol. II, No. 1: Knowledge Management, Mar. 2014, 8 pgs.

Baloch et al., "Comparative Study of Risk Management in Centralized and Distributed Software Development Environment", Sci. Int.(Lahore),26(4), 1523-1528, 2014, 6 pgs. Applicant points out, in accordance with MPEP 609.04(a), that the year of publication, 2014, is sufficiently earlier than the effective U.S. filing date of the present application, so that the particular month of publication is not in issue.

Balzarotti et al., "The impact of GPU-assisted malware on memory forensics: A case study", DFRWS 2015, 9 pgs. Applicant points out, in accordance with MPEP 609.04(a), that the year of publication, 2015, is sufficiently earlier than the effective U.S. filing date of the present application, so that the particular month of publication is not in issue.

Becker et al., "Applying Game Theory to Analyze Attacks and Defenses in Virtual Coordinate Systems," 41st International Conference on Dependable Systems & Networks (DSN), Jun. 2011, 12 pp.

Challagulla et al., "Empirical Assessment of Machine Learning based Software Defect Prediction Techniques," Proceedings of the 10th IEEE International Workshop on Object-Oriented Real-Time Dependable Systems (WORDS'05), Feb. 2-4, 2005, 8 pp.

Fisher, "Developing Software in a Multicore & Multiprocessor World," Klocwork.com., white paper, Sep. 2010, 9 pp.

Henriques de Gusmao et al., "Cybersecurity risk analysis model using fault tree analysis and fuzzy decision theory," International Journal of Information Management, Jul. 20, 2018, 2 pp.

Jones, "Software Defect Origins and Removal Methods," International Function Point Users Group, retrieved from https://insights.cermacademy.com/2012/12/6-software-defect-origins-and-removal-methods-c-capers-jones-technologyrisk/, Dec. 28, 2012, 29 pp.

Joyce et al., "MEGA: A Tool for Mac OS X Operating System and Application Forensics," Proceedings of the Digital Forensic Research Conference, Aug. 11-13, 2008, 9 pp.

Libicki, "Cyberdeterrence and Cyberwar," Rand Corporation, 2009, 238 pp.

McHale, "The Aegis Combat System's continuous modernization," Military Embedded Systems, retrieved from http://mil-embedded.com/articles/the-aegis-combat-systems-continuous-modernization/, Aug. 26, 2016, 7 pp.

Porche III et al., "A Cyberworm that Knows no Boundaries," RAND Corporation, 2011, 6 pp.

PR Newswire, "ATCorp Releases CSAS-Cloud Security Analysis Suite for Applications in the Cloud" Feb. 26, 2016, 2 pgs.

Prosecution History from U.S. Appl. No. 16/440,654, dated Aug. 20, 2019 through Dec. 28, 2020, 15 pp.

Quinlan et al., "ROSE User Manual: A Tool for Building Source-to-Source Translators," Draft User Manual, Version 0.9.6a, Lawrence Livermore National Laboratory, Dec. 16, 2015, 339 pp.

Rahman et al., "Defect Management Life Cycle Process for Software Quality Improvement," World Academy of Science, Engineering and Technology International Journal of Computer and Information Engineering, vol. 9, No. 12, Nov. 24, 2015, 4 pp.

Richard, "CERIAS: Memory Analysis, meet GPU Malware", Oct. 22, 2014, Retrieved from http://www.cerias.purdue.edu/news_and_events/events/security_seminar/details/index/popenihmencsf2v5mggg5ulfd4, 2 pgs.

Robbio, "How Will AI Impact Software Development?" Forbes Technology Council, Aug. 31, 2017, 4 pp.

(56) References Cited

OTHER PUBLICATIONS

ROSE: Main Page, Mar. 29, 2017, Retrieved from http://rosecompiler.org/ROSE_HTML_Reference/, 3 pgs.

Schneier, "Attack Trees-Schneier on Security", Dr. Dobb's Journal, Dec. 1999, Retrieved from https://www.schneier.com/academic/archives/1999/12/attack_trees.html, 9 pgs.

Shiva et al., "Game Theory for Cyber Security," Proceedings of the Sixth Annual Workshop on Cyber Security and Information Intelligence Research, Article No. 34, Apr. 2010, 5 pp.

Sironi et al., "Metronome Operating System Level Performance Management via Self-Adaptive Computing", DAC 2012, Jun. 3-7, 2012, 10 pgs.

Snyder et al., "Ensuring U.S. Air Force Operations During Cyber Attacks Against Combat Support Systems Guidance Where to Focus Mitigation Efforts," RAND Corporation, 2015, 36 pp.

U.S. Appl. No. 16/440,654, filed Jun. 13, 2019 by Joseph Sirianni et al.

U.S. Appl. No. 16/723,097, filed Dec. 20, 2019 by Robert A. Joyce et al.

U.S. Appl. No. 17/111,988, filed Dec. 4, 2020, by Christopher Dominessy et al.

Vasiliadis et al., "GPU-asssisted malware", Int. J. Inf. Secur. (2015), Published Aug. 28, 2014, 9 pgs.

Wikipedia-OpenCL, Mar. 29, 2017, Retrieved from https://en.wikipedia.org/wiki/OpenCL, 15 pgs.

Klees et al., "Evaluating Fuzz Testing," 2018 ACM SIGSAC Conference, Oct. 2018, 16 pp.

Fell, "A Review of Fuzzing Tools and Methods," Mar. 10, 2017, 21 pp.

\* cited by examiner

AUTOMATED SOFTWARE BUG DISCOVERY AND ASSESSMENT

This application is a continuation of U.S. application Ser. No. 16/440,654, filed Jun. 13, 2019, which claims the benefit of U.S. Provisional Application No. 62/802,364, filed Feb. 7, 2019, where the entire contents of each application are incorporated herein by reference.

STATEMENT REGARDING FEDERALLY SPONSORED RESEARCH OR DEVELOPMENT

This invention was made with government support under Contract No. N68335-18-C-0614 awarded by the United States Navy. The government has certain rights in this invention.

TECHNICAL FIELD

The disclosure relates to a computing system that implements software testing and debugging technology.

BACKGROUND

Software bugs are a significant risk to mission success and human safety. Increasingly, the public relies on computers and cyber-physical systems in mission-critical and safety-critical applications. Even in less-critical systems, software bugs are a major source of errors, system failure, and downtime. Decades of software engineering have demonstrated that making bug-free software may not be possible. Even "provably correct" software, which is too time-consuming and expensive for most real-world systems, can have bugs resulting from humans' inability to correctly provide specifications.

SUMMARY

In general, the disclosure is related to automated software bug discovery and assessment. In coding, bugs are errors resulting from sequences of code that cause the execution of the application to end in an unexpected manner or with unexpected results. While some bugs are obvious and lead to complete crashes in the application, other bugs are, on the surface, more benign. These bugs, also called latent bugs, can simply cause the execution to execute certain lines of source code more times than expected, or may cause certain variables within the source code to be statistical outliers, even though the variables are considered valid within the construct of the variable type. Even if these variables are not output to the user, these variables may influence various aspects of the execution of the application, potentially leading to other unexpected errors.

In accordance with the techniques described herein, a device may perform automated bug discovery and assessment by generating various sets of unique inputs used to populate initial variables during a particular execution of an application. Throughout each execution of the application, one for each unique set of inputs, the device tracks the various lines of source code encountered and the values of the various objects within the application at each point in the execution of the application. The device repeats this process multiple times, creating a statistical model of the object values and characteristics of the lines of source code (e.g., how many times each line of source code is encountered in an execution, how long the execution of each respective line takes, etc.). The device can then analyze this statistical model to determine which lines of code may be causing latent bugs that would not be obvious to a programmer. As such, the device may efficiently and effectively identify bugs that would be invisible or otherwise undetectable to a regular unit tester, resulting in higher quality applications that execute as intended. By providing higher quality applications, the users of these applications are further assured that the privacy, security, and reliability of these applications are at the highest possible quality given the constraints of the application itself.

In one aspect of the current disclosure, a method includes retrieving, by a computing device, source code of an application that is executed multiple times by the computing device. For each distinct execution of a plurality of executions of the application, the method further includes initiating, by the computing device, the respective execution of the application at a particular starting point of the source code, inputting, by the computing device and into the source code, a unique set of one or more inputs relative to any other executions of the application in the plurality of executions, storing, by the computing device and into a path log of a bug detection database, an indication of each line of the source code encountered during the respective execution of the application, and storing, by the computing device and into an output log of the bug detection database, an indication of each output object encountered during the respective execution of the application. Each output object comprises a local variable with a value dependent on one or more of the inputs from the unique set of one or more inputs. The method also includes analyzing, by the computing device and using a machine learning model, the path logs and the output logs stored in the bug detection database to identify an abnormality indicative of a potential bug in the source code. The method further includes outputting, by the computing device and for display, a graphical representation of the abnormality.

In another aspect of the current disclosure, a computing device includes at least one processor a storage device configured to store one or more modules operable by the at least one processor. The one or more modules are operable by the at least one processor to retrieve source code of an application that is executed multiple times by the computing device. For each distinct execution of a plurality of executions of the application, the one or more modules are operable by the at least one processor to initiate the respective execution of the application at a particular starting point of the source code, input, into the source code, a unique set of one or more inputs relative to any other executions of the application in the plurality of executions, store, into a path log of a bug detection database, an indication of each line of the source code encountered during the respective execution of the application, and store, into an output log of the bug detection database, an indication of each output object encountered during the respective execution of the application. Each output object comprises a local variable with a value dependent on one or more of the inputs from the unique set of one or more inputs. The one or more modules are further operable by the one or more processors to analyze, using a machine learning model, the path logs and the output logs stored in the bug detection database to identify an abnormality indicative of a potential bug in the source code. The one or more modules are also operable by the at least one processor to output, for display, a graphical representation of the abnormality.

In another aspect of the current disclosure, a non-transitory computer-readable storage medium storing instructions that, when executed, cause one or more processors of a computing device to retrieve source code of an application that is executed multiple times by the computing device. For each distinct execution of a plurality of executions of the application, the instructions further cause the one or more processors to initiate the respective execution of the application at a particular starting point of the source code, input, into the source code, a unique set of one or more inputs relative to any other executions of the application in the plurality of executions, store, into a path log of a bug detection database, an indication of each line of the source code encountered during the respective execution of the application, and store, into an output log of the bug detection database, an indication of each output object encountered during the respective execution of the application. Each output object comprises a local variable with a value dependent on one or more of the inputs from the unique set of one or more inputs. The instructions also cause the one or more processors to analyze, using a machine learning model, the path logs and the output logs stored in the bug detection database to identify an abnormality indicative of a potential bug in the source code. The instructions further cause the one or more processors to output, for display, a graphical representation of the abnormality.

In another aspect of the current disclosure, an apparatus includes means for retrieving source code of an application that is executed multiple times by the computing device. For each distinct execution of a plurality of executions of the application, the apparatus further includes means for initiating the respective execution of the application at a particular starting point of the source code, means for inputting, into the source code, a unique set of one or more inputs relative to any other executions of the application in the plurality of executions, means for storing, into a path log of a bug detection database, an indication of each line of the source code encountered during the respective execution of the application, and means for storing, into an output log of the bug detection database, an indication of each output object encountered during the respective execution of the application. Each output object comprises a local variable with a value dependent on one or more of the inputs from the unique set of one or more inputs. The apparatus also includes means for analyzing, using a machine learning model, the path logs and the output logs stored in the bug detection database to identify an abnormality indicative of a potential bug in the source code. The apparatus further includes means for outputting, for display, a graphical representation of the abnormality.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
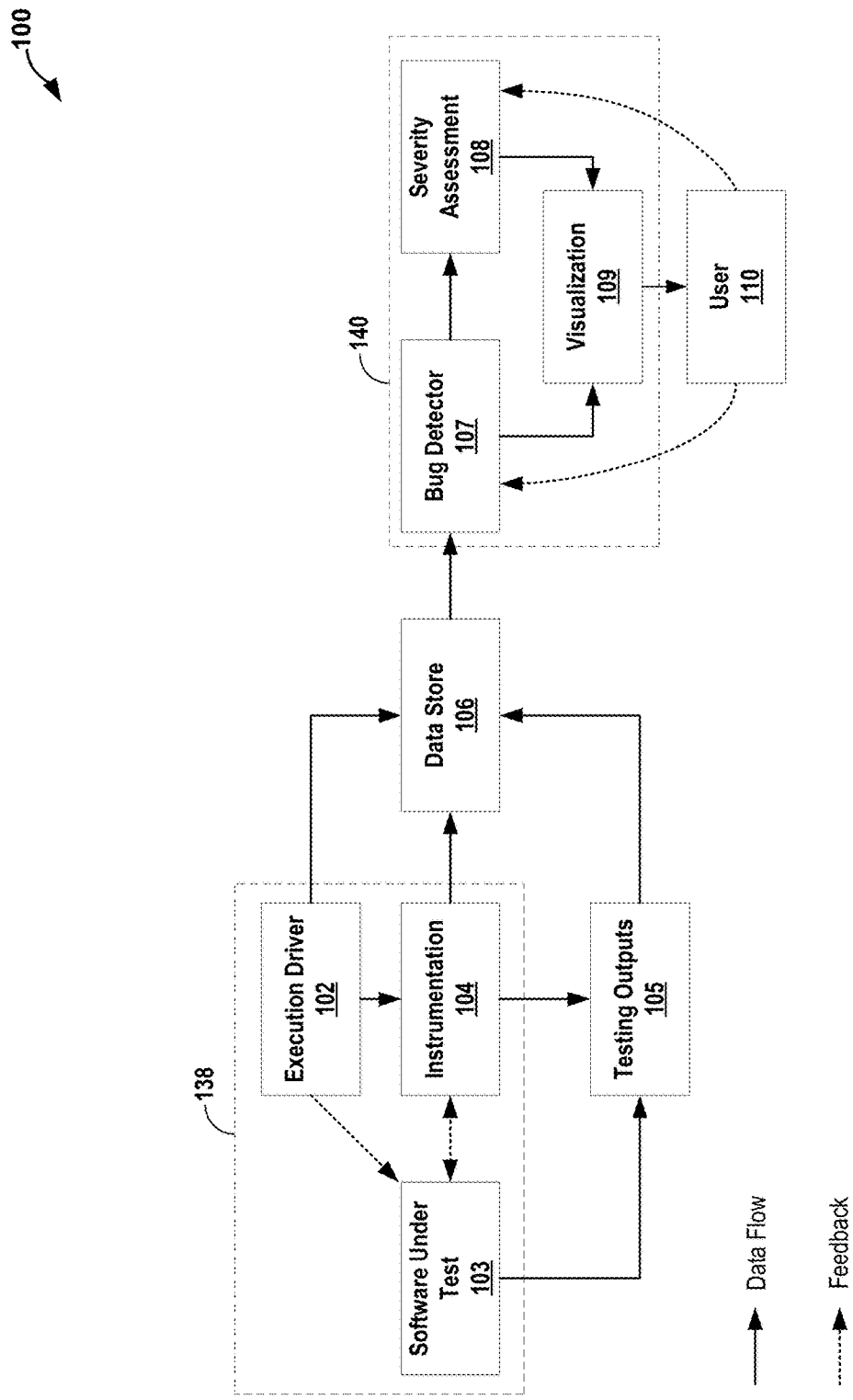
FIG. 1 is a block diagram illustrating an example testing system in accordance with the techniques described herein.

The techniques described herein provide an automated software testing toolset for analyzing potential release candidate builds before deployment. The techniques described herein provide the tools to identify source code that has the potential to be a source of latent errors that may cause problems. The techniques described herein analyze data obtained from software testing, discovers bugs using a machine-learning bug detector, automatically assesses the severity of the potential bug, and displays the results to the user. The techniques described herein can perform automated testing and data acquisition using a variety of execution driver and instrumentation components or can use the outputs of existing software testing procedures. User feedback may improve the accuracy of the detection and assessment mechanisms. Severity may be a combination of multiple factors, including the negative impact the bug has on the system and likelihood of the bug being exercised incidentally or by an adversary. In a world where a limited amount of effort is available for assessing and fixing bugs, prioritizing the potential bugs that are the most severe is an important step in optimizing software quality procedures.

In some examples, software may be a critical component of ship and strike group self-defense. Therefore, software quality is of utmost importance. Any software defects (bugs) present can have mission-critical impacts on the defense of various assets. In order to field the best software, the software must undergo thorough testing. Throughout the software development process, software may undergo hours of testing, producing terabytes of data. In some examples, the testing may be accomplished with two labs and a modeling and simulation suite concurrently providing combat system data. The current process of debugging includes the following steps: find the bug through testing, conduct additional testing to determine the bug's priority (mission criticality and impact) and probability (chance of occurrence), apply root cause analysis to attribute the bug to specific code areas, and fix the bug. After this process is completed, it is repeated to ensure elimination of the bug and determine if there are any changes that might create another bug. These processes are often necessary because a missed bug that is fielded may degrade a ship's combat capability or create an unintended loss of life or dangerous operational situations. While the commercial industry has the ability to field less than perfect software and simply respond to user complaints about functionality through rapidly deployable upgrades, military software must have a much higher quality standard to avoid degraded defensive capabilities.

Similar to current commercial debugging processes, certain testing processes may provide terabytes of data that can lead to possible issues, but this data is not currently analyzed unless there is a visible error onboard the ship. However, the manual analysis by humans of all of the data generated through testing is not cost-effective, which drives the need for machine-learning algorithms to learn system behavior and identify out-of-pattern behaviors. Additionally, unlike commercial software upgrades, some upgrades go through longer approval and certification timelines before they can be released. Subsequently, reducing these timelines through automated data analysis can significantly impact both cost and performance of these systems.

The techniques described herein also include a visualization component. This visualization component may use information from the bug detector and severity assessment system to display information about potential bugs and their impact in the context of the system as a whole. The result is that a larger number of software bugs will be discovered, and thus fixed, prior to software deployment. Fixing more bugs will improve the reliability of the software and reduce the risk to mission success and human safety.

The techniques described herein may further interrogate a binary executable program with a corpus of inputs and capture program states to apply a machine-learning bug detector to identify potential bugs. The techniques described herein may automatically assess the severity of the potential bug, and display the results to the user. The techniques described herein can perform automated testing and data acquisition using a combination of execution driver and instrumentation components or can use the outputs of existing software testing procedures. User feedback improves the accuracy of the detection and assessment mechanisms.

Software bugs may be a significant risk to mission success and human safety. Software testing and analysis, which are used to combat bugs, are difficult, and thus time-consuming and expensive. It is particularly difficult to find latent bugs (e.g., bugs that do not have obvious, observable effects on the system). This results in undiscovered and unfixed bugs in the system. New approaches to automated software testing offer the opportunity to catch bugs with less time and cost than manual approaches. To achieve this, the techniques described herein include an automated software testing tool that finds latent errors in a program by analyzing large amounts of testing output. The techniques described herein use big-data machine learning techniques to autonomously analyze records of program behavior to find and prioritize anomalous behavior that may indicate an undiscovered software bug.

Most testing focuses on overt bugs, which do have a readily observable effect or a deleterious impact that was anticipated by a human. A natural fix to time-consuming processes is automation, but there may be significant shortcomings in automated software testing. In particular, complex systems are hard to test, and are extremely hard to develop accurate automated tests for.

The techniques described herein provide an innovative approach for automated software bug detection. These techniques operate in parallel with existing software testing approaches and require minimal additional time, but promises to discover bugs that are not found by the existing testing. In particular, the techniques described herein discover latent bugs, which do not have observable effects on the system and are very hard to detect with current testing approaches. The result is that a larger number of software bugs may be discovered, and thus fixed, prior to software deployment. This may improve the reliability of the software and reduce the risk to mission success and human safety. In general, one goal of the techniques described herein is to develop pattern recognition algorithms that identify and characterize latent errors in the software code of operational software prior to deployment.

The automation capability described herein may analyze recorded data from software systems to find latent errors and provide data-driven priority and probability prior to certification and deployment. This technology may enable high priority bug detection and repairs before fielding the system and enable the fielding of a combat system at full capability. As a result, development and maintenance costs of the software tested may be reduced. Latent error detection may ensure that the best quality software is fielded and works effectively. Testing can be very expensive; therefore, improvements in finding and fixing software bugs may lead to less testing being required. This may result in a more capable upgrade, faster deployment, and cost savings.

As noted above, most testing focuses on overt bugs, which have a readily observable effect to the user. Less obvious bugs can be missed and may have a greater impact on applications later in the development cycle. Unit testing is one approach to discover errors within individual software components, but unit testing often ignores the bugs that could occur between components. Additionally, these tests are created by human testers that are unable to fully anticipate how these complex systems might fail. The release-test-patch development cycle has an inherent higher risk for mission-critical software. The techniques described herein may reduce the chance of latent errors in release software.

The weaknesses of automated testing are well-illustrated by unit testing. Unit testing is a popular, automated testing approach that is frequently used by software developers. Unit tests automate well, but they only analyze the behavior of individual small software components. Even if a software component passes all of its tests, there is no guarantee that the system as a whole may work correctly, because the interaction between components is a very significant source of errors. While it is possible to make unit tests covering inter-component behavior, as the system gets larger and more complicated, making these tests borders on the impossible. Further, the entire testing approach is limited by the fact that humans have to write the tests. Humans being unable to anticipate the ways in which a complex system might fail results in tests that fail to catch bugs, just as it resulted in software bugs in the first place.

Instances of these bugs may not cause a crash, but the techniques described herein may find the disparity between the runtime states between the run that exercised the latent errors and those that did not. The bug detector produces a list of lines associated with the anomaly and gives context into the state of the program at the time. The user can then view those results in a user-friendly user interface (UI), with automated severity assessment to prioritize bug fixes.

The software solution of the techniques described herein may analyze, e.g., upwards of 300 terabytes of data throughout the development lifecycle of a baseline. In doing so, the software solution may use big data and machine learning algorithms and technology to characterize the patterns of system behavior and identify out-of-process behaviors that lead to system failure. Through analysis of large amounts of data, the software solution may provide large-scale analysis of software data that encompasses all testing for the baseline. This may help find and fix high priority bugs by finding bugs that have been overlooked by systems analysts and providing better data on the probabilities and impacts of bugs. The software solution may also be able to identify whether defects have been fixed over the lifetime of the software development, and are no longer issues in the most recent builds.

The techniques described herein include a concept for pattern recognition algorithms that automatically reveal bugs in software and modeling and analysis of data sets. The concept can feasibly analyze outputs of software data extraction and find latent errors that may contribute to mission failure.

The majority of software testing is whole-system testing, which can be automated, semi-automated, or manual. Manual whole-system testing is how many commercial software bugs are found, but this requires a release-testpatch cycle that is inappropriate for many software development models. It also exposes end users to unfixed bugs, which is dangerous for mission-critical software. Automated whole-system testing streamlines the process and makes it easier to find bugs prior to software release, but it is generally restricted to overt bugs, or bugs that have an observable effect. While this is a reasonable approach to finding some bugs, including critical bugs, it suffers from the weakness that it is very difficult to find latent bugs, or bugs that do not have an obvious, observable effect. An automated testing system can only find errors that the system knows how to check for, which means that the bug needs to have an effect that the system can check and that a human needs to create the requirement for this check. Latent bugs are errors in the software that, in the context of the automated testing procedure, may create abnormal internal system states, but do not cause an externally-visible effect that a human has had the foresight to check. A latent bug, though, could be actuated in a non-testing situation, either incidentally or by an adversary, and become a bug that has an overt, and potentially very serious, effect.

The techniques described herein provide for automated testing to look at the less-observable state and outputs of the program and identify patterns of anomalous behavior that indicate a bug, either one that is not observed or one that was not fully exercised by the test. By looking at the latent state of the software, the techniques described herein may be well-equipped to find latent bugs. By using an automated analysis system, such as machine learning, to find anomalous patterns of internal state that indicate a possible bug, the techniques described herein can get away from the problem of needing overt effects or human-developed test conditions. This approach offers the opportunity to find, with little effort and cost, software bugs that are difficult to find with existing testing techniques. When used in conjunction with existing testing techniques, the techniques described herein expect to catch substantially more bugs overall, resulting in a reduced risk to mission success and human safety for limited additional cost.

To address the need for next-generation automated software testing, the techniques described herein include a software evaluation tool that uses big-data analysis and machine learning to identify and perform risk assessment of software bugs, including potential latent bugs. FIG. 1 is a block diagram illustrating an example testing system in accordance with the techniques described herein. The techniques described herein analyze data obtained from software testing, discover bugs using a machine-learning bug detector 107, automatically assess the severity of the potential bug, and display the results to the user. The techniques described herein can perform automated testing and data acquisition using a variety of execution driver 102 and instrumentation components or can use the outputs of existing software testing procedures. User feedback may improve the accuracy of the detection and assessment mechanisms.

The central component of the techniques described herein is the bug detector 107, a machine-learning system that analyzes a corpus of data to identify potential bugs. The inputs to the bug detector 107 are, typically, the outputs from testing, such as logs and recorded instrumentation. The bug detector 107 is an unsupervised binary classifier—it finds patterns in the test records that are anomalous, without any prior knowledge of what erroneous or correct behavior looks like. The bug detector 107 uses highly scalable machine-learning algorithms so that it can scale to massive (e.g., 300+TiB) datasets. Bug detector 107, along with severity assessment module 108 and visualization component 109, are each included within analysis module 140.

The bug detector 107 is supplied with data to analyze by the execution driver 102 and instrumentation software components. The execution driver 102 provides an automated testing mechanism. The techniques described herein uses a plug-in architecture so that it easily supports a variety of execution driver 102 and instrumentation implementations. This enables the techniques described herein to integrate with any development and testing tools and workflow and to take advantage of additional data sources if they are available. Execution driver 102, along with instrumentation 104 and software under test 103, are each included within testing module 138.

The techniques described herein feature a machine-learning-based bug severity scoring system, which uses similar learning principles as the bug detector 107 to estimate the severity of a potential bug. This is important because software bugs—and, particularly, potential bugs—need to be prioritized for analysis and correction based on their severity. Severity is a combination of multiple factors, including the negative impact the bug has on the system and the likelihood of the bug being exercised incidentally or by an adversary. In a world where a limited amount of effort is available for assessing and fixing bugs, prioritizing the potential bugs that are the most severe is an important step in optimizing software quality procedures. The techniques described herein also include a visualization component 109, which may be based on security analysis software. This visualization component 109 uses information from the bug detector 107 and severity assessment 108 system to display information about potential bugs and their impact in the context of the system as a whole.

Software test and instrumentation outputs obtained during software testing are stored in the data store 106. This persistent data store 106 enables users to compare bug detection results with previous testing—for example, to examine whether a particular bug in an earlier version of the software was addressed in this newer version. The user also has the opportunity to provide feedback, both for the bug detector 107 and for the severity assessment 108, that improves the results of those machine learning components. If, for example, a potential bug is determined to be "not a bug", that information can be used to train the bug detector 107 algorithm so that particular pattern of behavior does not results in potential-bug reports in the future.

The techniques described herein uses big-data machine learning approaches to ensure scalability to very large test data sets. Each component is designed with independence in mind, so that software tests and analysis routines can be run in parallel efficiently. The machine learning algorithms, which are the primary computational bottleneck, use industry-standard parallelizable technologies in order to scale to petabyte-scale data sets.

One innovation of the techniques described herein is its application of machine-learning-based anomaly detection to program outputs to identify patterns that indicate the presence of a potential bug. This approach identifies latent, rather than just overt, software bugs, making it much more valuable. The techniques described herein builds on this innovation by providing a flexible system for obtaining software test data, a system for assessing the severity of potential bugs and visualizing the results, and a system for tracking whether an identified bug persists or has been fixed.

The techniques described herein provide a software tool that automatically identifies and classifies software bugs through the use of machine learning and big-data analysis.

An automated bug discovery and assessment system, such as the techniques described herein, may meet the following technical requirements: detect instances of potential bugs automatically from test outputs and other software instrumentation, focus in particular on the class of bugs that does not produce overt, observable effects, detect patterns indicative of a latent bug even if the bug is not exercised during testing, automatically assess the severity of discovered potential bugs to support making prioritization decisions, determine whether a particular identified potential bug is still present in a later iteration of software or if it has been fixed, process large-scale recorded program data on the order of, e.g., 300 terabytes, and integrate with testing framework and process test data and outputs.

In accordance with the techniques described herein, execution driver 102 retrieves source code of an application, such as software under test 103, that is executed multiple times by execution driver 102. For each distinct execution of a plurality of executions of the application, execution driver 102 initiates the respective execution of the application at a particular starting point of the source code. Execution driver 102 also inputs, into the source code, a unique set of one or more inputs relative to any other executions of the application in the plurality of executions. Instrumentation 104 stores, into a path log of a bug detection database (e.g., data store 106), an indication of each line of the source code encountered during the respective execution of the application. Instrumentation 104 also stores, into an output log of the bug detection database (e.g., data store 106), an indication of each output object encountered during the respective execution of the application. Each output object comprises a local variable with a value dependent on one or more of the inputs from the unique set of one or more inputs.

When the different executions are completed, bug detector 107 analyzes, using a machine learning model, the path logs and the output logs stored in the bug detection database to identify an abnormality indicative of a potential bug in the source code. Visualization component 109 outputs, for display to user 110, a graphical representation of the abnormality.

Bug detector 107 may detect instances of potential bugs automatically from test outputs and other software instrumentation. This is because the techniques described herein use one-class linear support vector machine (SVM) machine learning algorithms to identify anomalous patterns of software behavior or internal state that correspond to potential software bugs.

Severity assessment module 108 may automatically assess the severity of discovered potential bugs. In this way, the techniques described herein use machine learning to automatically evaluate the severity of a discovered potential bug and uses a visualization interface, based on particular software, to display the impact of the bug on the system as a whole and to support bug severity analysis and prioritization.

Bug detector 107 may determine whether a particular identified potential bug is still present in a later iteration of software or if it has been fixed. In this way, the machine-learning algorithms and testing infrastructure of the techniques described herein enable re-examining, with a new version of software, a test or tests that were identified as containing a potential bug in order to determine whether the bug is still present. The visualization interface tracks detected bugs between software versions to automatically determine fixed, unfixed, and new bugs.

System 100 may also process large-scale recorded program data on the order of 300 terabytes. In this way, the techniques described herein use scalable machine-learning algorithms and industry-standard big-data implementations in order to scale to large inputs using cluster computing systems.

Execution driver 102 may also integrate with the testing framework and process test data and outputs. In this way, the techniques described herein may integrate with current software testing procedures. In particular, the plug-in design of the techniques described herein inputs (execution driver and instrumentation) support using existing software testing outputs.

In order to perform machine learning, the techniques described herein utilize a data set representing the behavior of software under test 103. The techniques described herein leverage the execution driver 102 to run the software under test 103 with different inputs or configurations to produce a corpus of outputs. The instrumentation component 104 records various information about the program as it runs.

Instrumentation 104 may also produce additional testing outputs 105, which may include the final result of the program execution. Instrumentation 104 may store testing outputs 105 into data store 106.

For the execution driver 102 component, a scripted test harness that executes the software under test 103 with a corpus of inputs may be used. A fuzz tester, such as American Fuzzy Lop (AFL), may also be used to automate generation of input corpora that provide broad code path coverage. For instance, AFL may save the files that produce unique cases of paths, crashes, and hangs which served as a set of inputs to capture with instrumentation component 104.

For the instrumentation component 104, a framework of tools may be leveraged for capturing the entire program state of each program execution. Existing debugging or instrumentation libraries, such as the GNU debugger (GDB), may be used to output parts of the program's internal state during execution. For instance, GDB with Python may step through the program and capture features that could indicate the presence of a bug. These features include: Source code files, function names, line numbers, time to execute the steps, local variables, register values, and if the step caused the program to crash. Additionally, instrumentation component 104 may monitor a metadata dataset for each program execution that summarized the time, total lines stepped through, and each time an individual line was stepped through. The software under test 103's built-in logging (e.g., verbose mode) may also be utilized.

These components may be commercially useful, providing an effective and convenient mechanism for obtaining software testing data for analysis by the techniques described herein. These components may also demonstrate how the architecture can be extended to incorporate additional data.

Software test data directly from current testing procedures may also be used. Current software testing results may be integrated into the techniques described herein and instrumentation may be added to existing testing to obtain more data for the techniques described herein.

Bug detector 107 may find known bugs in open source software. After the execution driver 102 and instrumentation 104 create a viable dataset with known bugs having been exercised, bug detector 107 may analyze the data to determine features that are the most indicative of a bug. Principal Component Analysis (PCA) may be used to find features with the highest variance. It would remove local variables that never change and make it clear if certain register values are not likely to be meaningful for discovering anomalous behavior. PCA may also facilitate data visualization by enabling data sets with many variables to be displayed on two orthogonal axes that represent the features with highest variance.

The high-level data, or metadata, provided straightforward data values that may be directly used as features for modeling. Namely, bug detector 107 may compute Z-scores for each line of code using the number of times that line executed for each instrumented run of the program being evaluated. The number of rows in each data group may correspond to the number of times the instrumented program was run. Thus, bug detector 107 may include many program runs in the metadata sets used for modeling and bug detection, to ensure that the computed Z-scores are representative.

The techniques described herein may model the low-level, or raw, data using several different feature representations, including various permutations of various options. A first option includes using the local variable and register values as features, which may require converting any non-numerical values into numerical representations for machine learning (ML) libraries that require numerical features, such as scikit-learn. A second option includes using the first two principal components as features, computed from the raw data values using Principal Components Analysis (PCA). A third option includes using n-grams of sequential program steps as features, where a given number of code lines that executed before and after the current line being modeled are recorded in order to form an n-gram representing the contextual code execution path. A fourth option includes scaling feature values using the ML library's scaling function, such as scikit-learn's StandardScaler operator. A fifth option includes scaling feature values using the ML library's normalization function, such as scikit-learn's Normalize operator. Note that some of these modeling approaches only may be performed as completely unsupervised learning, such as Z-scoring, whereas others may be performed using "believed good" training datasets, such as n-gram matching.

Bug detector 107 may automatically assess bug priority to model user input of bug likelihood and consequence of the bug detector 107 results and model that to apply to future bugs. In this manner, bug detector 107 may implement a supervised approach since users would define bug priorities differently across projects. To initialize this effort, the user interface output in visualization component 109 may enable user 110 to review the results and input their opinions on the severity of each bug.

In using an anomaly detection approach, many latent bugs may manifest themselves as a pattern of behavior where some executions of the software may have internal system states, as revealed by instrumentation component 104, that differ in a statistically significant way from the internal states in most executions of the software. The fact that this problem utilizes an unsupervised machine-learning approach is significant. There may be no ground truth with which one could train a supervised machine-learning system. In order to have a ground truth, one would need a version of the software (or at least, a corpus of executions of the software) that is free of bugs, even hidden ones. This conflicts with the entire problem: software has latent bugs, and it is difficult to know what these bugs look like. The techniques described herein solve this problem by using an unsupervised approach, which does not require a ground truth and discovers the anomalous classes itself.

Z-scoring is a statistical technique where each datapoint in a dataset is assigned one or more Z-values. Each Z-value represents the signed number of standard deviations that the datapoint is from the dataset mean, where a positive value indicates deviation greater than the mean and a negative value indicates deviation less than the mean. A Z-value can be computed and assigned independently for each column, or feature, in the dataset, or some numerical combination of features can be used to compute a Z-value. Typically, a Z-value with an absolute value greater than three indicates a statistical outlier, because for a Normal, or Gaussian, distribution fewer than 0.3% of the data population will possess such a value.

Machine learning technology for bug detector 107 may include one-class linear support vector machines (SVMs). These are capable of unsupervised learning, meaning that it does not require class labels for the training data, and instead learns a decision boundary describing all the training datapoints, treated as a single class. One-class SVMs are well-regarded for anomaly detection. Further, linear SVMs parallelize well, enabling the techniques described herein to use the bug detector 107 on big-data architectures. Another possibility is principal component analysis (PCA), which may be used for scalable unsupervised anomaly detection. The techniques described herein, in some examples, may use a library for an analytics engine as the basis for the machine-learning system. This may make the techniques easy to scale, with high performance, to large data sets using a big-data cluster computing architecture. Both linear SVM and PCA scale well in cluster computing architectures and may be implemented in the library. The techniques described herein may utilize any combination of these machine learning techniques, in addition to Z-scoring, and apply these techniques to the raw, or low-level, data collected throughout the execution of the bug detection techniques described herein. The objective is to identify statistical or probabilistic outliers in the runtime data that indicate anomalous, potentially buggy, behavior in the corresponding program's code that produced the anomalous datapoint(s).

To assess bug severity, a second machine learning system may be used. This machine learning system is separate from bug detector 107 for at least two reasons: so that the assessment of the bug severity does not negatively impact the accuracy of determining whether something is a bug, and because the severity assessment 108 has looser requirements. While the bug detector 107 needs to be an unsupervised binary classifier (something is either a bug or not, and there may be no ground truth), the severity assessor may be neither of these. The system may be trained by taking examples of bugs and indicating their severity. These looser requirements give much more leeway in selecting a machine learning algorithm. Initially, linear SVM may be used for either classification or regression (respectively, SVM-C and SVM-R), since these algorithms are well-supported by various libraries and computing architectures. SVM-C may support classifying bugs into discrete severity categories, such as Critical, Major, and Minor; SVM-R may result in a continuous severity score (e.g., 0 to 100). In some examples, a regression tree may implement a simplified sentiment analysis approach adapted for code modeling based on the user's feedback. In other examples, a more complex sentiment analysis system may be adapted to provide better scaling for large code bases.

In other examples, a hybrid machine-learning and rule-based system may be used, along with user feedback, for severity assessment 108. In this system, one or more machine learning algorithms, such as SVM and classification and regression trees (CART), are combined with a user-specified policy-based ruleset (e.g., "bugs in this software component are automatically rated at least Major severity") to produce severity assessment 108.

The techniques described herein also include a bug visualization component 109. This component may be based on a security analysis and visualization tool. This may be an extensible tool for users to visualize and analyze the results of automated testing tools in the context of a whole-system security model, in order to assess the impact of a potential problem on the system as a whole. This visualization system may help users quickly assess the collection of bugs found by the techniques described herein.

In testing the accuracy and performance of the machine-learning bug detector 107, the testing may include scalability testing and assessment on the system that implements the techniques described herein. Bug detector 107 may be engineered to run on big-data computing systems.

A design for how the techniques described herein may consume the software testing records produced by current testing procedures is described. The techniques described herein include a user interface and workflow that supports the requirement to detect whether or not a detected potential bug is fixed in a later iteration of the software under test 103. The techniques described herein further create recommendations for additional software instrumentation that could most benefit bug detection. Because of the plug-in design of the execution driver 102 and instrumentation component 104, integrating the techniques described herein with test output may not be a significant risk.

The techniques described herein may capture the entirety of the program state throughout each execution in a number of different ways. In addition to GDB, the techniques described herein may modify AFLs path detection that inserts logging instructions into the target binary on compilation. AFL's instruction set can be changed to log local variable and timestamp values that would otherwise have been captured using GDB. This approach prevents the overhead of interrupting the CPU on each step to gather the program state, and instead each test case may have a continuous execution. The second approach is to implement a kernel module that can monitor instruction calls from a target program and use debugging symbols to find variable values in memory.

Additionally, the techniques described herein may implement a database as the medium for program state data between the instrumentation 104 and bug detector 107 components. Particular databases setups may be particularly beneficial for the implementation of the techniques described herein, including those with increased flexibility due to a NoSQL schema that remains efficient even with a wide column structure. Instrumentation component 104 may be capable of running in parallel with the execution driver 102 without hindering its ability to exercise a significant portion of the code paths.

The bug detector 107 component may rely heavily on access to a variety of output from outside systems, such as weapons systems, database systems, analysis systems, intelligence systems, or any other computing device. These outside systems may be comprised of a number of components that will each have their own debug output. Correlating these logs will present a challenge that the bug detector 107 will need to account for. In addition, text parsing will be a large factor in creating meaningful analysis of the logging output for the model to be effective. To address these challenges, bug detector 107 may implement Natural Language Processing (NLP), a subcategory of machine learning that enables computers to gain a semantic understanding of a language, and could produce a generalized approach beyond the needs of any particular outside system. High-level data, such as program debug output, contains anomalies that indicate bugs.

In some examples, the techniques described herein may model individual lines of code across a number of runs and detect anomalous values in variables, registers, and time to execute. This may potentially produce false-positives, but the techniques described herein may incorporate a number of filtering mechanisms to combat these false positives. A first filtering mechanism may include further separating models, not only by line numbers, but by code paths to reduce overlap of non-related data. A second filtering mechanism may include removing uninitialized variables that have large meaningless variance. A third filtering mechanism may include identifying lines as anomalous that do not pass a minimum threshold for being called. With these changes, bug detector 107 may reduce the number of false-positives, making it a more practical bug detector 107 model.

Bug detector 107 may be dedicated to identifying statistical outliers across program executions within a diverse set of datasets. Bug detector 107 may export these outliers with contextual information regarding the program and point developers to the problematic source code.

To provide greater automated severity assessment 108 of anomalous behavior identified by the bug detector 107, severity assessment 108 may incorporate a feature set for assessing both likelihood and consequence. Severity assessment 108 may utilize a robust sentiment analysis-based approach to model the surrounding source code of an identified anomaly. NLP is a subcategory of machine learning that enables computers to gain a semantic understanding of a language. Incorporating NLP may provide more accurate assessment of code blocks. Severity assessment 108 may utilize a model that both understands the contextual code and incorporates variable values. This may enable a labeling process to generate models based on a user's feedback and automatically make personalized severity assessments in the future. As such, severity assessment 108 may be dedicated to determining the likelihood and consequence of potential latent errors to aid developers in prioritizing bug fixes.

Execution driver 102 may interface with a target binary file to generate a variety of novel test cases influenced by the program states they cause, such as feedback-guided iterative testing. Execution driver 102 may create test cases for programs that have different input interfaces, such as command line and graphical user interfaces.

In implementing the techniques described herein into the development cycle of software under test 103, the execution driver 102 may interface with a target binary and exercise its complex systems in an effective way. The techniques described herein may thoroughly exercise file parsing software. However, there are many other ways in which a program accepts input data. To address other input data, execution driver 102 may utilize numerous techniques, such as: (1) generating network packets that meaningfully test a protocol and data components beyond the initial parsing, (2) Graphical User Interface (GUI) testing to support programs that do not have headless mode, and (3) emulator support to black-box testing for binaries. Execution driver 102 may also support the encapsulation of multiple components to exercise interactions between them, which are likely to be another source of latent errors in software. As such, execution driver 102 may be capable of generating a corpus of interesting test cases for different types of input interfaces, making it possible to thoroughly evaluate all components of software under test 103.

The techniques described herein review and label results in an interactive manner and enable a developer to be as involved and in-the-loop with the automated severity assessment process as desired. To support this, the techniques described herein may provide a user interface (UI) that is both guided and allows the user to influence decisions made by severity assessment component 108. In some examples, the UI may be even further expanded. For example, a guided user experience may suggest likelihood and consequence labels. Developers can then choose to modify the labels that will influence future severity assessment to provide more tailored bug fix prioritization. The user interface also incorporates all components of system 100 to configure the bug detector 107 settings. As new capabilities are added to system 100, the UI may be updated to reflect these changes and provide the user with the opportunity to take full advantage of these features.

Current mission planning efforts may greatly benefit from a software automation process that can find errors and provide data-driven priority and probability prior to certification and deployment. This technology may enable high priority bug detection and repairs before fielding the system and enable the fielding of a combat system at full capability. As a result, software development and maintenance costs may be reduced. This error detection may ensure that the best quality software is fielded. Testing can be very expensive; therefore, the better any service or commercial entity becomes at finding and fixing software bugs, the less time may be wasted chasing down errors. This may result in a better upgrade, faster deployment, and cost savings.

Developers may benefit significantly from an automated tool that can identify and improve problems in the source code as well as suggest improvements to the architecture of the software as a whole. In addition, developers can use the techniques described herein as they update applications to benefit from newer computer architectures.

One of the drivers of this market may be financial institutions such as insurance and banking. Evolving business conditions in the banking industry and dynamic changes in the core system market are driving legacy modernization decisions that may dramatically change banking's existing technology landscape. Certainly, as these traditional industries are buffeted by change, they may be candidates for updating legacy systems and implementing new software to make their systems more efficient and responsive to changing market conditions. A tool like the techniques described herein would fit into this market as a testing solution for software engineers in these areas.

Another market ripe for automated software testing is the medical field. There are many software developers that write for this market and many healthcare organizations find that they have a homegrown software product that has been in place for many years, and does not send data to other systems, or may require software patches or workarounds just to keep it limping along. Modernizing legacy code bases can be a boon to the task of developing medical device software that is network aware, secure and capitalizes on hardware innovations. Software design failures may be the single most common cause for device recalls.

One other potential market could be game applications. Such applications are computationally intensive and typically written with a very fast development schedule. The techniques described herein may be perfectly positioned to support game developers, since these techniques may increase productivity and decrease the expertise required to implement the optimizations. The techniques described herein may not only have military and government applications but also applications to the commercial sector.

Figure 2:
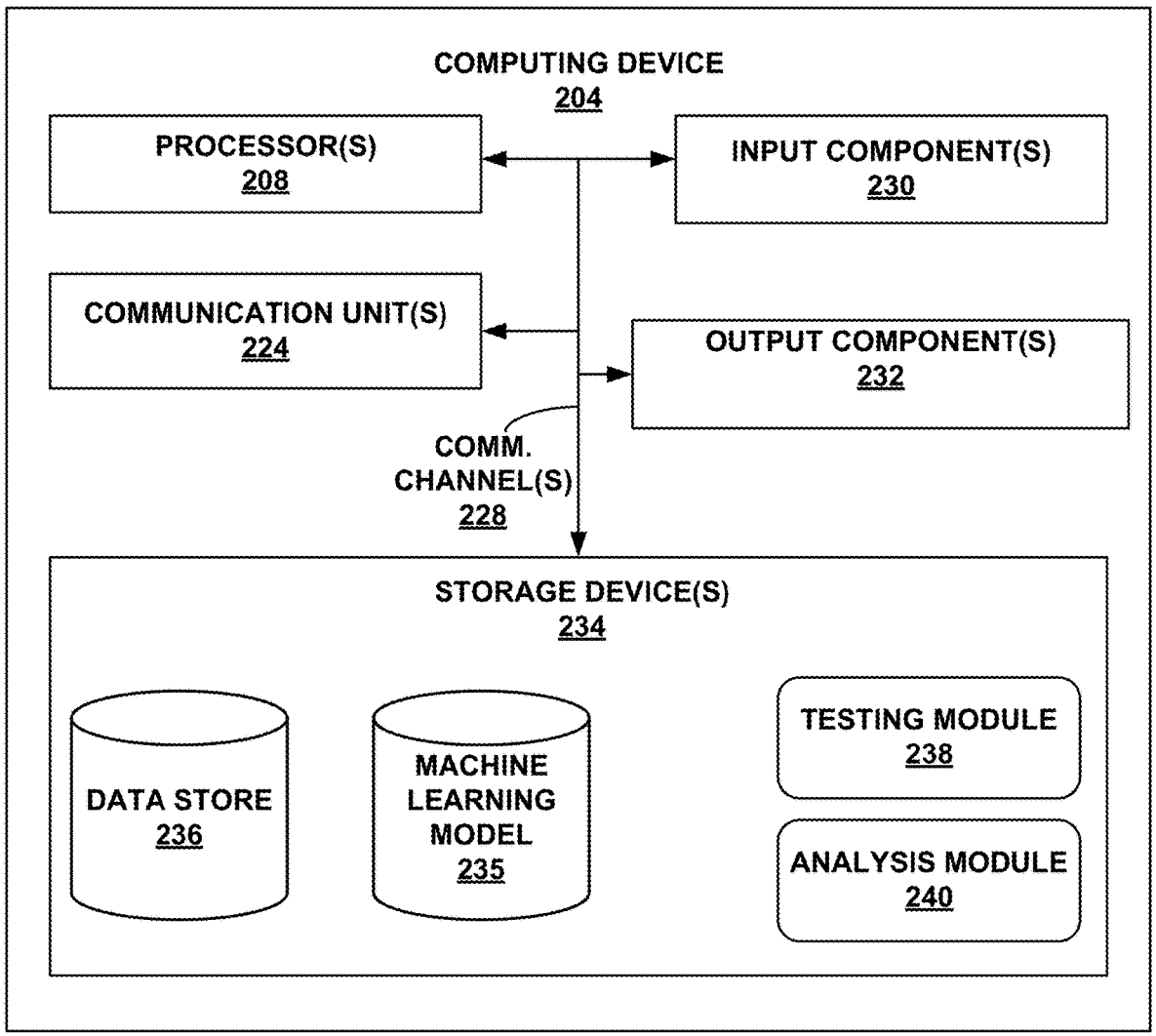
FIG. 2 is a block diagram illustrating an example device configured to perform the bug detection techniques in accordance with the techniques described herein.

FIG. 2 is a block diagram illustrating an example device configured to perform the bug detection techniques in accordance with the techniques described herein. Computing device 204 of FIG. 2 is described below as one particular example of system 100 shown in FIG. 1. FIG. 2 illustrates only one particular example of system 100, and many other examples of system 100 may be used in other instances and may include a subset of the components included in example computing device 204 or may include additional components not shown in FIG. 2.

For example, computing device 204 may include a battery to provide power to the components of computing device 204. Similarly, the components of computing device 204 shown in FIG. 2 may not be necessary in every example of computing device 204. For example, in some configurations, computing device 204 may not include communication units 224. As shown in the example of FIG. 2, computing device 204 includes one or more processors 208, one or more input components 230, one or more communication units 224, one or more output components 232, and one or more storage devices 234.

Output components 232, in some examples, are configured to provide output to a user using tactile, audio, or video stimuli. Output components 232, in one example, include an electronic display, a loudspeaker, or any other type of device for converting a signal into an appropriate form understandable to humans or machines. The electronic display may be a liquid crystal display (LCD) or organic light-emitting diode (OLED) part of a touch screen, may be a non-touchscreen direct view display component such as a cathode ray tube (CRT), light-emitting diode (LED), LCD, or OLED. The display component may also be a projector instead of a direct view display.

Input components 230, in some examples, is configured to receive input from a user through tactile, audio, or video feedback. Examples of input components 230 include a display component, a mouse, a keyboard, a camera, a microphone or any other type of device for detecting input from a user. In some examples, a display component includes a touch-sensitive screen.

One or more storage devices 234 of computing device 204 include machine learning model 235, data store 236, testing module 238, and analysis module 240. One or more storage devices 234 may be configured to store information within computing device 204 during operation. Storage device 234, in some examples, is described as a computer-readable storage medium. In some examples, storage device 234, machine learning model 235, and data store 236 is a temporary memory, meaning that a primary purpose of storage device 234, machine learning model 235, and data store 236 is not long-term storage. Storage device 234, machine learning model 235, and data store 236, in some examples, are described as volatile memories, meaning that storage device 234, machine learning model 235, and data store 236 do not maintain stored contents when the computing device is turned off. Examples of volatile memories include random access memories (RAM), dynamic random-access memories (DRAM), static random access memories (SRAM), and other forms of volatile memories known in the art. In some examples, storage device 234 is used to store program instructions for execution by processors 208.

Storage devices 234, machine learning model 235, and data store 236, in some examples, also include one or more computer-readable storage media. Storage devices 234, machine learning model 235, and data store 236 may be configured to store larger amounts of information than volatile memory. Storage devices 234, machine learning model 235, and data store 236 may further be configured for long-term storage of information. In some examples, storage devices 234, machine learning model 235, and data store 236 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Communication channels 228 may interconnect each of the components 208, 224, 230, 232, 234, 235, 236, 238, and 240 for inter-component communications (physically, communicatively, and/or operatively). In some examples, communication channels 228 may include a system bus, a network connection, an inter-process communication data structure, or any other method for communicating data.

One or more communication units 224 of computing device 204 may communicate with external devices, such as a server device, via one or more wired and/or wireless networks by transmitting and/or receiving network signals on the one or more networks. Communication units 224 may include a network interface card, such as an Ethernet card, an optical transceiver, a radio frequency transceiver, or any other type of device that can send and receive information. Examples of such network interfaces may include Bluetooth, infrared signaling, 3G, LTE, and Wi-Fi radios as well as Universal Serial Bus (USB) and Ethernet. In some examples, computing device 204 utilizes communication units 224 to wirelessly communicate with another computing device that is operably coupled to computing device 204.

One or more processors 208, in one example, are configured to implement functionality and/or process instructions for execution within computing device 204, such as those associated with modules 238 and 240. For example, processors 208 may be capable of processing instructions stored in storage device 234. Examples of processors 208 may include, any one or more of a microprocessor, a controller, a digital signal processor (DSP), an application specific integrated circuit (ASIC), a field-programmable gate array (FPGA), or equivalent discrete or integrated logic circuitry.

In accordance with the techniques described herein, testing module 238 retrieves source code of an application that is executed multiple times by the computing device. For each distinct execution of a plurality of executions of the application, testing module 238 initiates the respective execution of the application at a particular starting point of the source code. Testing module 238 then inputs, into the source code, a unique set of one or more inputs relative to any other executions of the application in the plurality of executions. Testing module stores, into a path log of a bug detection database (e.g., data store 236), an indication of each line of the source code encountered during the respective execution of the application. Testing module 238 stores, into an output log of the bug detection database (e.g., data store 236), an indication of each output object encountered during the respective execution of the application. Each output object includes a local variable with a value dependent on one or more of the inputs from the unique set of one or more inputs.

In storing the path log and output log in the bug detection database, testing module 238 may store, into a test log in the bug detection database, each of the path log, the output log, and the unique set of one or more inputs for the respective execution. Analysis module 240 may then analyze each individual test log as a set to detect potential bugs.

In essence, testing module 238 may track the state of the application throughout each unique execution of the application. For instance, for each execution of the plurality of executions of the application, testing module 238 may track one or more execution statistics for the respective execution. These execution statistics could include one or more of a time to completion, a number of instances of a particular line of code being executed, an average time per step, a local variable value, a registry value at a particular line of code, a total number of lines of code executed, a time to completion for each line of code, and an indication of whether the coded computer program crashed on a particular line of code. Testing module 238 may store the one or more execution statistics for the respective execution process in data store 236.

Testing module 238 then determines whether there are additional distinct executions to be tested (e.g., if more sets of untested inputs are available). If testing module 238 determines that more distinct executions should be tested, testing module 238 may initiate one of the additional executions and repeat the execution process. Conversely, if testing module 238 determines that each distinct execution from the plurality of executions has been tested, analysis module 240 analyzes, using machine learning model 235, the path logs and the output logs stored in the bug detection database to identify an abnormality indicative of a potential bug in the source code. Machine learning model 235 may be an unsupervised machine learning model. Analysis module 240 outputs, for display on output components 232, a graphical representation of the abnormality.

In some instances, machine learning model 235 may include multiple machine learning models, such as a first machine learning model for bug detection and a second machine learning model for severity assignment. In such instances, in response to identifying the abnormality, analysis module 240 determines, using the second machine learning model, a severity of the abnormality.

In some instances, the abnormality may be a latent bug. In such instances, in analyzing the path logs and the output logs, analysis module 240 may determine that one or more of a particular path log or a particular output log contains an outlier compared to every other path log or every other output log stored in the bug detection database. For example, analysis module 240 may determine, using standard deviations of values in the output log, whether the output log contains a statistical outlier compared to every other output log stored in the bug detection database. In other examples, for each input in the respective set of one or more inputs in the test log, analysis module 240 may determine, using N-grams in the path log, whether one or more of a line of the source code before the respective input in the path log or a line of the source code after the respective input in the path log is the outlier compared to every other path log.

In the instances where execution statistics are tracked by testing module 238, for each execution statistic of the one or more execution statistics tracked for each execution, analysis module 240, in the analyzing portion of the bug detection process, may create a distribution of the respective execution statistic from each execution and analyze the respective execution statistic from each execution to identify a statistical outlier in the distribution of the respective execution statistic. In response to identifying the statistical outlier, analysis module 240 determines that a latent bug exists for the execution process that produced the respective test log. In such examples, in outputting the graphical representation of the abnormality, analysis module 240 may output, for display on output components 232, a visual indication of the one or more execution statistics for the respective execution.

Figure 3:
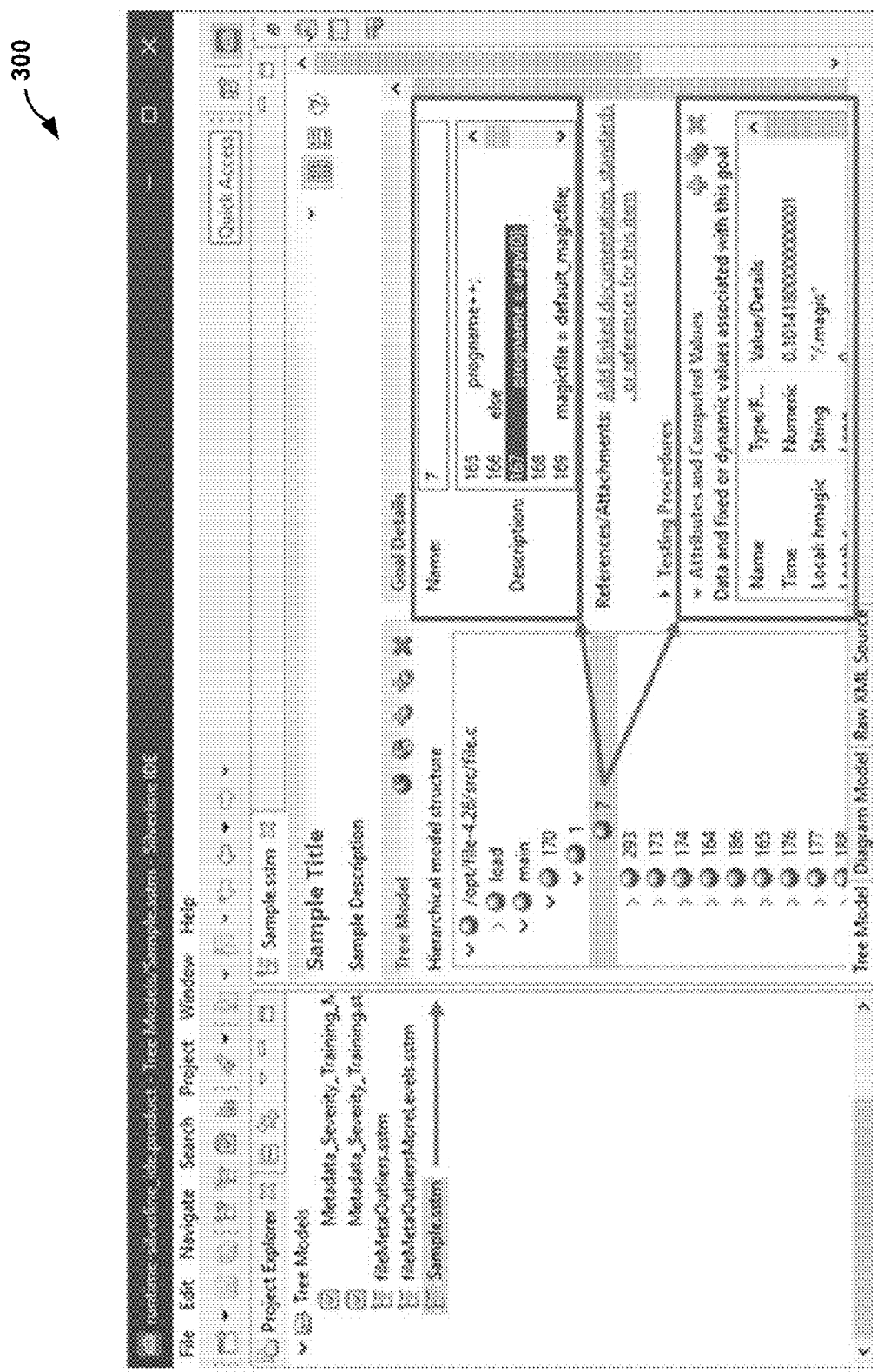
FIG. 3 is a conceptual diagram illustrating a first example screenshot generated by an example testing system in accordance with the techniques described herein.

FIG. 3 is a conceptual diagram illustrating a first example screenshot 300 generated by an example testing system in accordance with the techniques described herein. Bugs are selected in the tree model hierarchy which separates bugs by file, function, line number, run sequence, and step sequence. The right-hand view enables the developer to take a detailed look at the program state when the anomaly occurred.

A bug detector, as described throughout, may pinpoint locations of where anomalies occurred in the code and output indications of those locations, along with the statistics that caused the anomaly. The bug detector may also determine which variables are affected at the determined location, along with any other identifying information for the anomaly.

Figure 4:
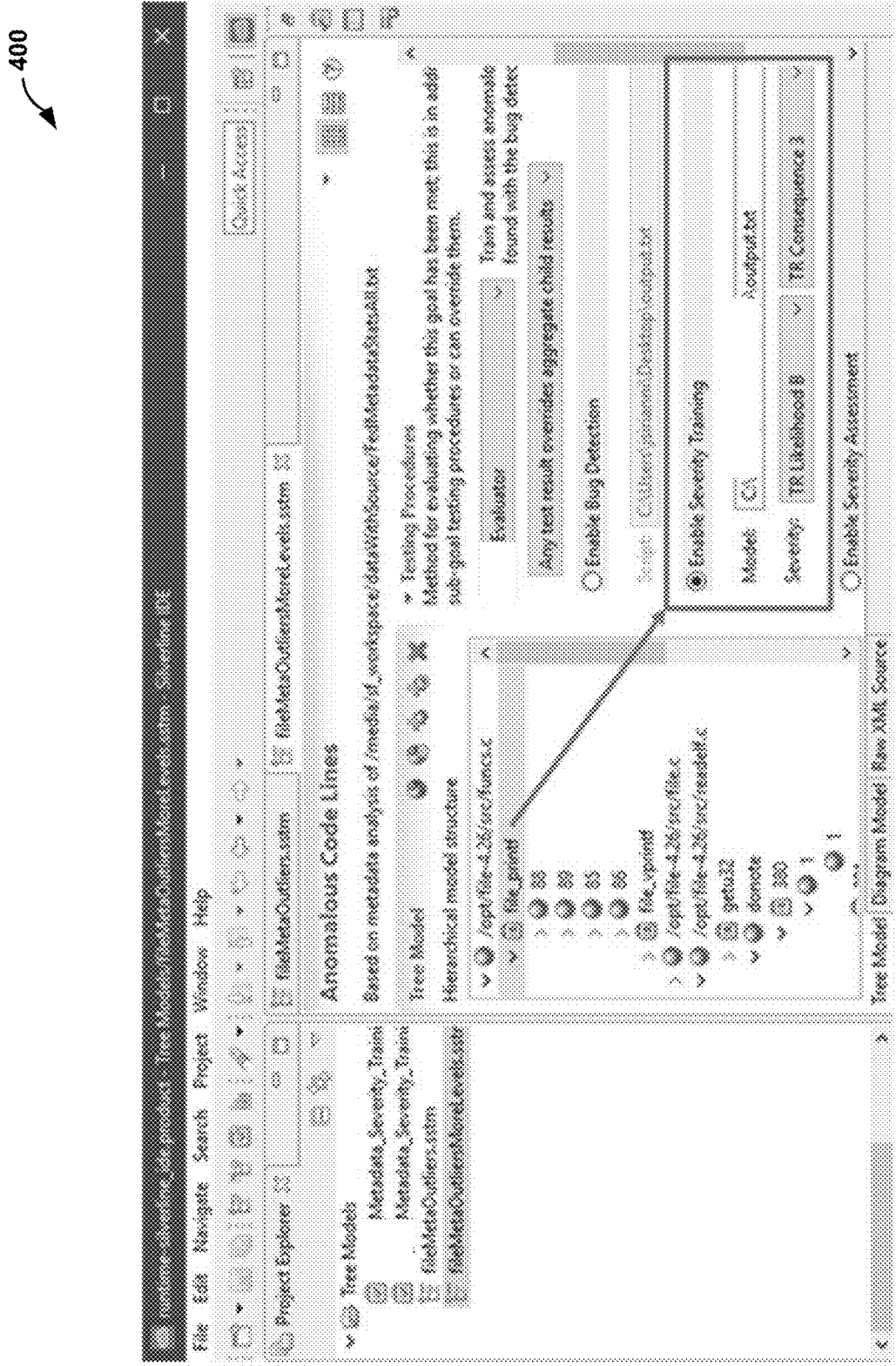
FIG. 4 is a conceptual diagram illustrating a second example screenshot generated by an example testing system in accordance with the techniques described herein.

FIG. 4 is a conceptual diagram illustrating a second example screenshot 400 generated by an example testing system in accordance with the techniques described herein. When the developer has determined a severity ranking, the developer can label the anomaly which will be modeled for future automated severity assessment. The severity may also be automatically determined using a machine learning model, and the automatically determined severity may be output by a computing device in this view. The bug detector may output the severity along with the indication of the anomaly, as described in FIG. 3.

Figure 5:
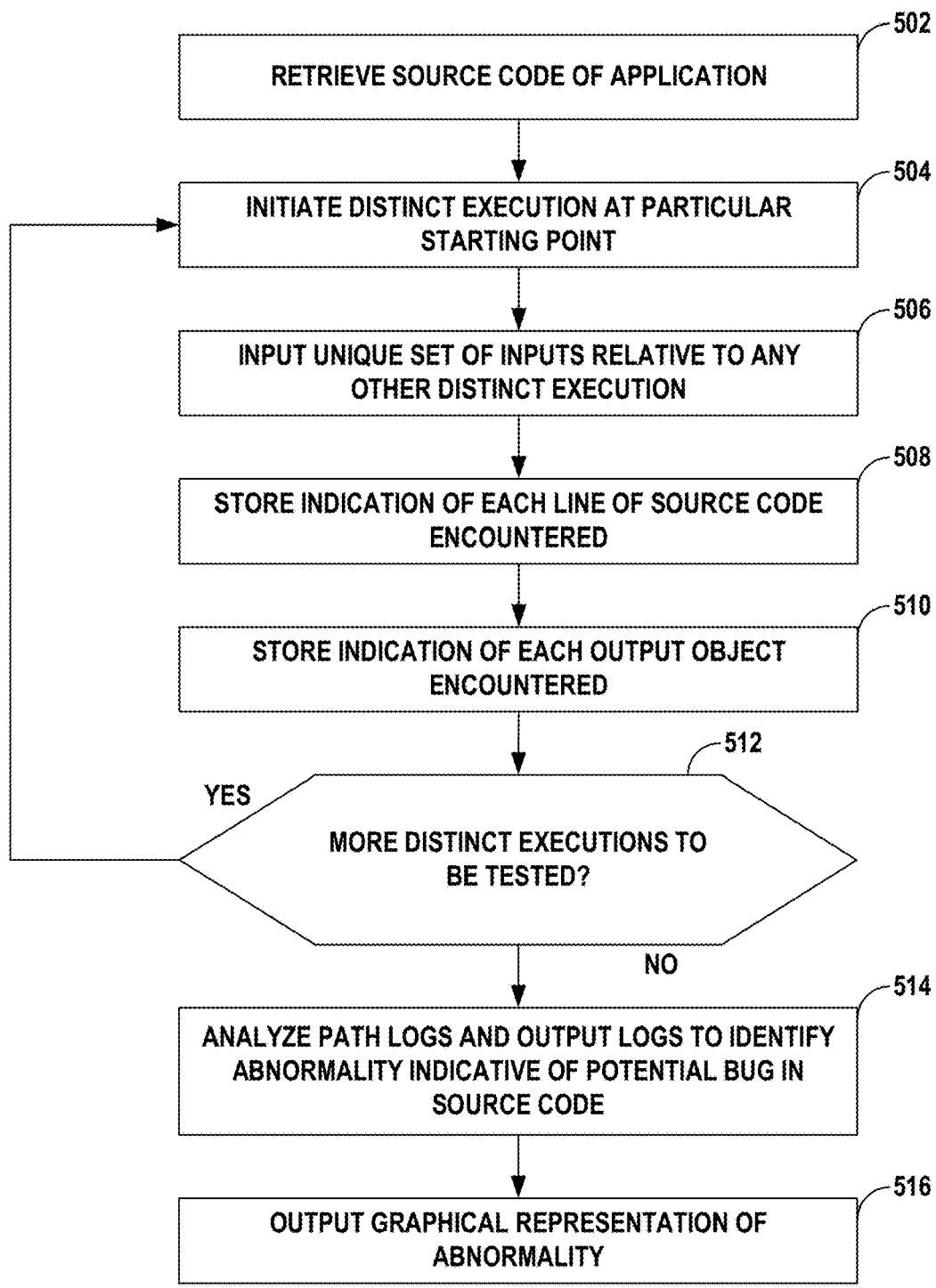
FIG. 5 is a flow diagram illustrating an example bug detection and analysis process in accordance with the techniques described herein.

FIG. 5 is a flow diagram illustrating an example bug detection and analysis process, in accordance with the techniques described herein. The techniques of FIG. 5 may be performed by one or more processors of a computing device, such as system 100 of FIG. 1 and/or computing device 204 illustrated in FIG. 2. For purposes of illustration only, the techniques of FIG. 5 are described within the context of computing device 204 of FIG. 2, although computing devices having configurations different than that of computing device 204 may perform the techniques of FIG. 5.

In accordance with the techniques described herein, testing module 238 retrieves (502) source code of an application that is executed multiple times by the computing device. For each distinct execution of a plurality of executions of the application, testing module 238 initiates (504) the respective execution of the application at a particular starting point of the source code. Testing module 238 then inputs (506), into the source code, a unique set of one or more inputs relative to any other executions of the application in the plurality of executions. Testing module stores (508), into a path log of a bug detection database (e.g., data store 236), an indication of each line of the source code encountered during the respective execution of the application. Testing module 238 stores (510), into an output log of the bug detection database (e.g., data store 236), an indication of each output object encountered during the respective execution of the application. Each output object includes a local variable with a value dependent on one or more of the inputs from the unique set of one or more inputs.

Testing module 238 then determines (512) whether there are additional distinct executions to be tested (e.g., if more sets of untested inputs are available). If testing module 238 determines that more distinct executions should be tested ("YES" branch of 512), testing module 238 may initiate (504) one of the additional executions and repeat the execution process outlined in steps 504-510. Conversely, if testing module 238 determines that each distinct execution from the plurality of executions has been tested ("NO" branch of 512), analysis module 240 analyzes (514), using machine learning model 235, the path logs and the output logs stored in the bug detection database to identify an abnormality indicative of a potential bug in the source code. Analysis module 240 outputs (516), for display, a graphical representation of the abnormality.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise random access memory (RAM), read-only memory (ROM), electrically erasable programmable read-only memory (EEPROM), compact disc read-only memory (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method comprising:
   obtaining, by a computing device, source code of an application that is executed multiple times by the computing device;
   for each execution of a plurality of executions of the application:
      inputting, by the computing device and into the source code, a unique set of one or more inputs relative to any other executions of the application in the plurality of executions;
      storing, by the computing device and into a path log of a plurality of path logs in a bug detection database, an indication of one or more lines of the source code encountered during the respective execution of the application; and
      storing, by the computing device and into an output log of a plurality of output logs in the bug detection database, an indication of one or more output objects encountered during the respective execution of the application, wherein each output object comprises a variable with a value dependent on one or more of the inputs from the unique set of one or more inputs;
   determining, by the computing device, that one or more of the path logs or one or more of the output logs contain an outlier compared to other respective ones of the path logs or the output logs stored in the bug detection database;
   identifying, by the computing device and based on the determining, an abnormality indicative of a potential bug in the source code; and
   outputting, by the computing device and for display, a graphical representation of the abnormality.

2. The method of claim 1, further comprising:
   for each execution of the plurality of executions of the application, initiating, by the computing device, the respective execution of the application at a particular starting point of the source code.

3. The method of claim 1, wherein identifying the abnormality uses a first machine learning model, and the method further comprising:
   in response to identifying the abnormality, determining, by the computing device and using a second machine learning model different than the first machine learning model, a severity of the abnormality.

4. The method of claim 3, wherein at least the first machine learning model comprises an unsupervised machine learning model.

5. The method of claim 1, wherein determining that the one or more of the path logs or the one or more of the output logs contains the outlier comprises:
   determining, by the computing device, using standard deviations of values in the output logs, that the one or more of the output logs contains a statistical outlier compared to every other one of the output logs stored in the bug detection database.

6. The method of claim 1, wherein determining that the one or more of the path logs or the one or more of the output logs contain the outlier comprises:
   for each input in a respective set of one or more inputs in one or more test logs, determining, by the computing device, using N-grams in the path logs, whether one or more of a line of the source code before the respective input in the path logs or a line of the source code after the respective input in the path logs are the outlier compared to every other one of the path logs stored in the bug detection database.

7. The method of claim 1, further comprising:
   for each execution of the plurality of executions of the application:
      tracking, by the computing device, one or more execution statistics for the respective execution; and
      storing, by the computing device, the one or more execution statistics for the respective execution in the bug detection database; and
   for each execution statistic of the one or more execution statistics tracked for each execution:
      creating, by the computing device, a distribution of the respective execution statistic from each execution;
      analyzing, by the computing device, the respective execution statistic from each execution to identify a statistical outlier in the distribution of the respective execution statistic; and
      in response to identifying the statistical outlier, determining, by the computing device, that a latent bug exists for the respective execution that produced a respective test log stored in the bug detection database.

8. The method of claim 7, wherein the one or more execution statistics for a respective execution are one or more of a time to completion, a number of instances of a particular line of code being executed, an average time per step, a local variable value, a registry value at the particular line of code, a total number of lines of code executed, a time to completion for each line of code, or an indication of whether the application crashed on the particular line of code.

9. The method of claim 7, wherein outputting the graphical representation of the abnormality comprises:
   outputting, by the computing device and for display, a visual indication of the one or more execution statistics for a respective execution.

10. The method of claim 1, further comprising:
   for each execution of the plurality of executions, storing, by the computing device and into a test log in the bug detection database, each of the path log, the output log, and the unique set of one or more inputs for the respective execution.

11. A computing device comprising:
at least one processor; and
a storage device configured to store one or more modules operable by the at least one processor to:
obtain source code of an application that is executed multiple times by the computing device;
for each execution of a plurality of executions of the application:
input, into the source code, a unique set of one or more inputs relative to any other executions of the application in the plurality of executions;
store, into a path log of a plurality of path logs in a bug detection database, an indication of one or more lines of the source code encountered during the respective execution of the application; and
store, into an output log of a plurality of output logs in the bug detection database, an indication of one or more output objects encountered during the respective execution of the application, wherein each output object comprises a variable with a value dependent on one or more of the inputs from the unique set of one or more inputs;
determine that one or more of the path logs or one or more of the output logs contain an outlier compared to other respective ones of the path logs or the output logs stored in the bug detection database;
identify, based on the determining, an abnormality indicative of a potential bug in the source code; and
output, for display, a graphical representation of the abnormality.

12. The computing device of claim 11, wherein the one or more modules are further operable by the at least one processor to:
for each execution of the plurality of executions of the application, initiate the respective execution of the application at a particular starting point of the source code.

13. The computing device of claim 11, wherein the one or more modules are operable by the at least one processor to identify the abnormality using a first machine learning model, and wherein the one or more modules are further operable by the at least one processor to:
in response to identifying the abnormality, determine, using a second machine learning model different than the first machine learning model, a severity of the abnormality.

14. The computing device of claim 11, wherein the one or more modules operable by the at least one processor to determine that the one or more of the path logs or the one or more of the output logs contains the outlier are further operable by the at least one processor to:
determine, using standard deviations of values in the output logs, that the one or more of the output logs contains a statistical outlier compared to every other one of the output logs stored in the bug detection database.

15. The computing device of claim 11, wherein the one or more modules operable by the at least one processor to determine that the one or more of the path logs or the one or more of the output logs contain the outlier are further operable by the at least one processor to:
for each input in a respective set of one or more inputs in one or more test logs, determine, using N-grams in the path logs, whether one or more of a line of the source code before the respective input in the path logs or a line of the source code after the respective input in the path logs are the outlier compared to every other one of the path logs stored in the bug detection database.

16. The computing device of claim 11, wherein the one or more modules are further operable by the at least one processor to:
for each execution of the plurality of executions of the application:
track one or more execution statistics for the respective execution;
store the one or more execution statistics for the respective execution in the bug detection database; and
for each execution statistic of the one or more execution statistics tracked for each execution:
create a distribution of the respective execution statistic from each execution;
analyze the respective execution statistic from each execution to identify a statistical outlier in the distribution of the respective execution statistic; and
in response to identifying the statistical outlier, determine that a latent bug exists for an execution process that produced a respective test log stored in the bug detection database.

17. The computing device of claim 16, wherein the one or more execution statistics for a respective execution are one or more of a time to completion, a number of instances of a particular line of code being executed, an average time per step, a local variable value, a registry value at the particular line of code, a total number of lines of code executed, a time to completion for each line of code, or an indication of whether the application crashed on the particular line of code.

18. The computing device of claim 16, wherein the one or more modules operable by the at least one processor to output the graphical representation of the abnormality are further operable by the at least one processor to:
output, for display, a visual indication of the one or more execution statistics for a respective execution.

19. The computing device of claim 11, wherein the one or more modules are further operable by the at least one processor to:
for each execution of the plurality of executions, store, into a test log in the bug detection database, each of the path log, the output log, and the unique set of one or more inputs for the respective execution.

20. A non-transitory, computer-readable storage medium storing instructions that, when executed, cause one or more processors of a computing device to:
obtain source code of an application that is executed multiple times by the computing device;
for each execution of a plurality of executions of the application:
input, into the source code, a unique set of one or more inputs relative to any other executions of the application in the plurality of executions;
store, into a path log of a plurality of path logs in a bug detection database, an indication of one or more lines of the source code encountered during the respective execution of the application; and
store, into an output log of a plurality of output logs in the bug detection database, an indication of one or more output objects encountered during the respective execution of the application, wherein each output object comprises a variable with a value dependent on one or more of the inputs from the unique set of one or more inputs;

determine that one or more of the path logs or one or more of the output logs contain an outlier compared to other respective ones of the path logs or the output logs stored in the bug detection database;
identify, based on the determining, an abnormality indicative of a potential bug in the source code; and
output, for display, a graphical representation of the abnormality.

\* \* \* \* \*